Patented Oct. 18, 1932

1,882,741

UNITED STATES PATENT OFFICE

HANS BELLER, OF LUDWIGSHAFEN-ON-THE-RHINE, AND MARTIN LUTHER, OF MANNHEIM, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PRODUCTION OF EMULSIFYING AGENTS

No Drawing. Application filed April 5, 1929, Serial No. 352,900, and in Germany April 27, 1928.

This invention relates to the production of emulsifying agents. It is well known that oxidation products can be obtained by destructively oxidizing waxes in a broad sense and hydrocarbons of a lower molecular size with air, oxygen, nitrogen oxides or mixtures thereof, such processes being described for example in the U. S. specifications Nos. 335,962, 1,158,205, 1,668,871 and 1,762,688, in the German Patent No. 405,850 and in the application for U. S. patent Ser. No. 63,556, filed October 19, 1925.

We have found that products with excellent powers of emulsification can be obtained by treating the oxidation products obtained by a destructive oxidation by means of gaseous oxidizing agents containing oxygen of waxes such as paraffin wax or natural waxes and like materials having the appearance and molecular size of natural waxes, and especially the individual acid constituents of the said products either alone or mixed with one another or with other substances, for example natural fatty acids such as those from whale oil or wool grease, or oleic acid and the like, or resin acids, with from about 20 to 30 per cent their weight of chlorine at a temperature below 100° centigrade, the resulting chlorination products being then treated with basic agents, such as ammonia, dilute caustic soda solution, carbonate of soda and the like, for the formation of salts. In most cases working at a temperature even below 70° centigrade gives the best results. For example, products of great emulsifying power and stability are obtained by subjecting to the treatment herein specified the dark colored acid products obtainable by pressing crude products of the oxidation of paraffin wax or other waxes and the like materials. The composition of the said oxidation products varies considerably with the nature of the initial materials employed but usually they comprise saturated and unsaturated acids, lactones, hydroxy acids, ester alcohols and also compounds the nature of which has not been ascertained.

The chlorinated products, which usually contain from 5 to 15 per cent of chlorine, may be treated with basic agents prior to or after being mixed with the substances to be emulsified, such as tars, oils, fats, resins, cresols, higher alcohols, bitumens, hydrocarbons and their derivatives, in which other substances, such as sulphur, phosphorus, arsenic, selenium and the like may previously have been dissolved or distributed. The resulting emulsions may find application for many industrial purposes, for example in the construction of roads, in disinfection and the destruction of vermin and pests, and many others. The concentrated mixtures can be diluted with water in any desired proportion, by which means extremely stable emulsions or dispersions are obtained.

The following examples will further illustrate the nature of the said invention which however is not restricted thereto. The parts are by weight.

Example 1

100 parts of the acid products obtained by an oxidation of soft paraffin wax with the aid of air and subsequent purification from the unsaponifiable matter by conversion of the acid constituents into salts, extraction with gasoline and a treatment with acids, are dissolved in carbon tetrachloride and treated with from 20 to 30 parts of chlorine at a temperature of about 70° centigrade. After distilling off the solvent, the pale yellow, liquid chlorination product containing 12 per cent of chlorine is stirred into 5000 parts of molten Mexican asphalt, the mixture being then stirred, with an addition of dilute caustic soda solution, until an emulsion is formed. The resulting concentrated emulsion is extremely stable, and can be diluted with water without separation.

Example 2

100 parts of the dark colored constituents (mainly hydroxy-carboxylic acids and lactones) of an oxidation product from paraffin wax obtained, after oxidation by means of air, by separating them from the fatty acids by pressing and/or sweating out and being insoluble in petroleum ether, are dissolved in 200 parts of carbon tetrachloride and are treated for about 2 hours with from 20 to 30 parts of chlorine, at from 60° to 70° centigrade while vigorously stirring. After washing with water and distilling off the solvent, there remains a viscous, pale yellow product containing 10 per cent of chlorine which furnishes a stable oily emulsion on being mixed, in the proportion 1:20, with highly viscous lubricating oil, neutralized with 10 per cent ammonia and diluted with water.

*Example 3*

100 parts of a crude oxidation product obtained by oxidizing Montan wax by means of air are dissolved in carbon tetrachloride and treated at about 80° centigrade with from 20 to 30 parts of chlorine. After distilling off the solvent, the product is mixed, while warm, with 150 parts of a caustic soda solution of 20 per cent strength. The resulting emulsifying agent is diluted with water before use.

What we claim is:—

1. The process for the production of emulsifying agents which comprises treating a product of the destructive oxidation of a wax with from 20 to 30 per cent its weight of chlorine at a temperature below 100° centigrade and treating the resulting product with a basic agent.

2. The process for the production of emulsifying agents which comprises treating the acids contained in a product of the destructive oxidation of a wax with from 20 to 30 per cent its weight of chlorine at a temperature below 100° centigrade and treating the resulting product with a basic agent.

3. The process for the production of emulsifying agents which comprises treating the dark colored acids contained in a product of the destructive oxidation of a wax with from 20 to 30 per cent its weight of chlorine at a temperature below 100° centigrade and treating the resulting product with a basic agent.

4. The process for the production of emulsions which comprises treating a product of the destructive oxidation of a wax with from 20 to 30 per cent its weight of chlorine at a temperature below 100° centigrade, incorporating the resulting product with the materials to be emulsified and treating with a basic agent.

5. Emulsifying agents comprising a chlorinated product of the destructive oxidation of a wax containing about 5 to 15 per cent of chlorine.

6. Emulsifying agents comprising a chlorinated mixture of the acids of a product of the destructive oxidation of a wax with a content of about 5 to 15 per cent of chlorine.

In testimony whereof we have hereunto set our hands.

HANS BELLER.
MARTIN LUTHER.